United States Patent
Choiniere et al.

(10) Patent No.: US 9,897,688 B2
(45) Date of Patent: Feb. 20, 2018

(54) LASER DETECTION AND IMAGE FUSION SYSTEM AND METHOD

(71) Applicant: BAE SYSTEMS Information & Electronic Systems Integration Inc., Nashua, NH (US)

(72) Inventors: Michael J. Choiniere, Merrimack, NH (US); Brendan P. Cirillo, Merrimack, NH (US); Robert W. Constantino, Milford, NH (US); Egor V. Degtiarev, Merrimack, NH (US); Francis M. Feda, Sudbury, MA (US); Haijun H. Hu, Wellesley, MA (US); Mark R. Mallalieu, Westford, MA (US); Brian F. O'Donnell, Nashua, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 612 days.

(21) Appl. No.: 14/554,254

(22) Filed: Nov. 26, 2014

(65) Prior Publication Data
US 2017/0219693 A1    Aug. 3, 2017

Related U.S. Application Data

(60) Provisional application No. 61/963,352, filed on Nov. 30, 2013.

(51) Int. Cl.
*G06F 19/00* (2011.01)
*G01S 7/484* (2006.01)
*G01S 17/02* (2006.01)
*G01S 7/48* (2006.01)
*G01S 17/10* (2006.01)
*G06T 5/50* (2006.01)
*H04N 5/33* (2006.01)

(52) U.S. Cl.
CPC .......... *G01S 7/484* (2013.01); *G01S 7/4808* (2013.01); *G01S 17/023* (2013.01); *G01S 17/107* (2013.01); *G06T 5/50* (2013.01); *H04N 5/332* (2013.01); *G06T 2207/20224* (2013.01)

(58) Field of Classification Search
CPC ...... G01S 7/484; G01S 7/4808; G01S 17/023; G01S 17/107; G06T 5/50; G06T 2207/20224; H04N 5/332
USPC ....... 235/411, 412, 413, 414, 415, 416, 417, 235/418
See application file for complete search history.

(56) References Cited

U.S. PATENT DOCUMENTS

| 8,451,432 B2 | 5/2013 | Crawford et al. |
| 2013/0112879 A1* | 5/2013 | Meyers ............ G01J 5/02 250/341.8 |
| 2014/0063261 A1* | 3/2014 | Betensky ........ G01C 3/08 348/158 |

* cited by examiner

*Primary Examiner* — Karl D Frech
(74) *Attorney, Agent, or Firm* — Maine Cernota & Bardin; Scott J. Asmus

(57) ABSTRACT

This invention describes a method for operating a weapon targeting system comprising the steps of using a laser to fire a single pulse at a target to obtain a reflected laser pulse; detecting the reflected laser pulse as a signal by a SWIR focal plane; detecting background illumination by using the SWIR focal plane; scene clutter filter and using optical filtering if it is necessary to suppress background illumination.

19 Claims, 11 Drawing Sheets

EMBODIMENT USING INTERNAL LASER AND FIRST CAMERA (SWIR)

SYSTEM ENVIRONMENT

EMBODIMENT USING INTERNAL LASER AND FIRST CAMERA (SWIR)

SEE SPOT EMBODIMENT USING INTERNAL LRF AND SECONDARY IMAGER

FIG. 4 LASER PULSE ACQUISITION TIMING APPROACH, INTERNAL LASER SOURCE

FIRST CAMERA (SWIR) RECEIVER OPTICS AND FOCAL PLANE ARRAY

FOCAL PLANE PIXEL ACCUMULATED ELECTRONS

SEE SPOT EMBODIMENT USING EXTERNAL LASER DESIGNATOR

LASER PULSE ACQUISITION TIMING APPROACH, EXTERNAL LASER SOURCE

SYSTEM ARCHITECTURE

METHOD FLOW CHART

LASER DETECTION AND IMAGE FUSION SYSTEM AND METHOD

RELATED APPLICATIONS

This application claims the benefit of U.S. Provisional Application No. 61/963,352 filed Nov. 30, 2013. This application is herein incorporated by reference in its entirety for all purposes.

FIELD OF THE INVENTION

The invention relates to methods for targeting systems.

BACKGROUND OF THE INVENTION

In battlefield conditions it is often desirable to remotely identify an object as an item of interest. This is typically done using a hand-held or otherwise portable Laser Designator or Laser Rangefinder (LRF) to illuminate the object with laser energy such that an appropriate sensor system can detect the illumination and identify the object.

Operators of Designator systems have an operational need to determine the specific location being illuminated by the laser radiation (the laser spot). In the current state of the art, this task is complicated by several factors, not the least of which is that laser illumination sources typically utilize wavelengths invisible to the human eye in order to function covertly. Thus, it is imperative that laser designator systems provide a means for the operator to confirm that the correct object is being illuminated.

Optical reticles incorporated into a camera system are often used to provide an indirect visual indication of the direction of laser illumination. The propagation direction of the laser source is aligned (boresighted) to the line-of-sight of the reticle, such that the point observed at the center of the reticle is also the point illuminated by the laser. Since the laser illumination is not visible, the operator relies on boresight alignment being maintained to ensure that the laser energy is deposited at the location observed at the center of the reticle. Any angular boresight error results in the laser output being directed in a direction different than where the reticle is looking. This results the laser illuminating the incorrect location, a condition which is highly undesirable. Further, since the laser energy is not visible, this condition is not readily detectable by the operator.

Earlier laser trackers employed quadrant detectors to directly detect the reflected energy from the laser spot as a means to determine the angular direction of a laser-illuminated object relative to the line-of-sight of the Designator. This approach provided some assurance that the correct object was being illuminated.

A quadrant detector is a device containing four individual sensing elements arranged around a common center point. Determination of angular direction using a quadrant detector is accomplished by first measuring the intensity of the reflected laser light from the object of interest with incident on each of the four sensing elements within the detector. The relative amplitudes of the individual signals from the sensing elements are then used to determine the angular direction of the object. As an example, if the quadrant detector line-of-sight is pointing directly at the object then each of the four sensing elements will receive equal energy reflected from the object, and consequently will have equal output signals. Any deviation of the object off of the detector line-of-sight will result in an imbalance in the outputs from the sensing elements, which provides an indication of the direction to the object.

While trackers utilizing quadrant detectors are accurate under ideal conditions, they present a number of challenges in an operational environment; in particular a very high Signal to Noise Ratio (SNR) is required for accurate determination of the angular direction of the object relative to the tracker optical axis. In order to determine the angular location of an object at typical distances of three to four kilometers from the tracker with sufficient accuracy, a laser with high power output is required. Use of such a laser can be problematic due to size and weight of the laser and associated power supply, and because a bright, high power laser source is readily detectable, an undesirable condition in many applications.

Current systems require illumination by a laser source emitting either a continuous series of pulses or a constant output. Both approaches degrade the ability to operate covertly by providing an adversary more opportunity to detect the source of the laser transmission than that minimally provided by single-pulse operation.

A need exists to covertly illuminate an object using a single laser pulse. A single, short duration laser pulse would be directed at the object of interest, and the reflected signal detected in such a way as to provide an indication of the direction to the object. This allows the operator to determine the exact location of the laser spot while minimizing the ability of an adversary to detect the location of the laser source.

The See-Spot invention described herein avoids all of the issues inherent in current state-of-the-art Designators by providing direct visual confirmation of the location being illuminated, while using low power laser sources in single-pulse operation.

SUMMARY OF THE INVENTION

Embodiments include a laser marker and laser marker verification system comprising synchronizing an integration time of an exposure window of a first camera focal plane to an arrival of at least a single laser pulse reflected from an object, whereby the at least a single laser pulse originates from a laser source comprising and under the control of the laser marker system or originates from an external source not under control of the laser marker system; determining arrival timing of the laser pulse and focal plane array (FPA) exposure window synchronization timing for the at least a single reflected laser pulse or the series of reflected laser pulses from an adjunct system; detecting the reflected at least one laser pulse as a signal by the first camera focal plane array (FPA) with synchronous timing and minimized exposure window duration corresponding to a laser pulse event in a first image; obtaining a second image of the object without the reflected at least one laser pulse; spatially aligning the first and second images to eliminate effects of camera motion between the first and the second images; spatially correlating the location of the detected reflected at least one laser pulse in an image to corresponding locations in other acquired images; and providing an indication of the laser spot location in imagery of the object in a scene. For embodiments the at least a single pulse is a single short wave infrared (SWIR) pulse. Another embodiment comprises eliminating background clutter by subtracting the second image from the first image to create a difference image. For other embodiments the wavelength band of the first and the second camera is one of SWIR, long wavelength infrared (LWIR), mid-wavelength infrared (MWIR), and visible, such that the first camera is sensitive to a wavelength of the laser and wavelength band of the first camera is different from the wavelength band of the second camera. Yet other embodiments provide that at least a single laser pulse originates from an integral laser illuminator and pulse fire timing is under control of said system and synchronized to a focal plane detector array exposure window. Continuing embodiments include synchronizing timing of the focal plane detector array exposure window to pulsed laser illumination from an external laser source not under control of the system. Yet other embodiments apply a threshold value to pixel data from a difference image to reject pixel amplitudes below a defined minimum signal level as noise and to identify the pixels above the threshold value as signal to create a thresholded image. For further embodiments a spatial filter is applied to the thresholded image to identify a candidate pixel grouping that best matches an expected pixel by pixel extent of the laser pulse energy. Embodiments have receiver optics comprising an instantaneous field of view (IFOV) of about 200 µrad, an aperture diameter of about 60 mm, an F/# of about 2.08, a horizontal field of view (HFOV) of about 7.3 degrees, and a spectral bandwidth of about 0.9 µm to about 1.7 µm.

Another embodiment includes a method for operating a laser marker and laser marker verification system comprising the steps of providing a first imaging system capable of detecting reflected laser pulse energy from an illuminated source and synchronizing detector array exposure window of the system to arrival of a laser pulse; providing an optical filter to reduce the amount of ambient light on the detector array, and capable of being inserted in and removed from an optical path of the system; processing images from the imaging system comprising frame subtraction and spatial filtering to identify the spatial location of detected laser energy in acquired imagery; and inserting symbology indicative of a spatial location of a laser spot in output imagery of a first camera. Additional embodiments provide filtering with a narrow bandpass optical filter in an optical path allowing said laser pulse energy to pass through while suppressing as out-of-band detected background illumination particularly in bright conditions, whereby signal-to-noise ratio is increased allowing an increase in said exposure window duration. In included embodiments the exposure window duration is adjusted dynamically to account for bright day, overcast and night time operation. For yet further embodiments laser firing comprises predictive timing generated by a laser pulse detector correlated to known pulse repetition frequency (PRF) codes utilized by infrared markers and designators. Continuing embodiments provide a second imaging system aligned to a field of view of the first imaging system; transferring spatial location of the detected laser pulse energy to the second imaging system; identifying a spatial location in imagery of the second imaging system; and inserting symbology indicative of the spatial location of the laser spot in output imagery of the second imaging system. In another embodiment illumination conditions comprise bright sun, overcast daylight, full moon, quarter moon, clear starlight, and overcast starlight. Ongoing embodiments provide that a source of the detected reflected laser pulse energy is an external system issuing pulses in a known pattern, whereby prediction of arrival of next laser pulse is accomplished so that acquisition of the pulse by the first camera focal plane array is during exposure time of the first camera focal plane array. Some embodiments include transferring said laser spot location to optional additional cameras for indication of laser spot location in the imagery of these cameras. In embodiments a first camera frame of imagery not containing reflected laser energy is collected as representative of the scene and subtracted from a first camera frame of imagery that also includes energy from the reflected laser pulse. In still other embodiments a thresholding process and spatial filtering process are applied to the difference image as a means to identify the spatial location of the reflected laser spot in the first camera image.

A further embodiment includes a system for transferring the location of and displaying a laser spot display marker acquired through use of a first camera operating in a wavelength band sensitive to the laser wavelength to an image acquired from a second camera operating in a wavelength band insensitive to the laser wavelength comprising collecting imagery from the focal plane array (FPA) of the first camera; saving the first camera image of the object; firing a single laser pulse at the object; detecting reflected single laser pulse by the first camera FPA; detecting background illumination by the first camera FPA; suppressing the first camera background illumination; applying scene thresholding noise rejection filter; applying a spatial filter to the first camera image to allow detection of the location of the laser spot in the image; determining coordinates of the laser spot in the first camera image; collecting an image of the object using a second camera; locating laser spot coordinates determined from first camera image in the second camera image; and displaying the laser spot display marker at the laser spot coordinates in the second camera image.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
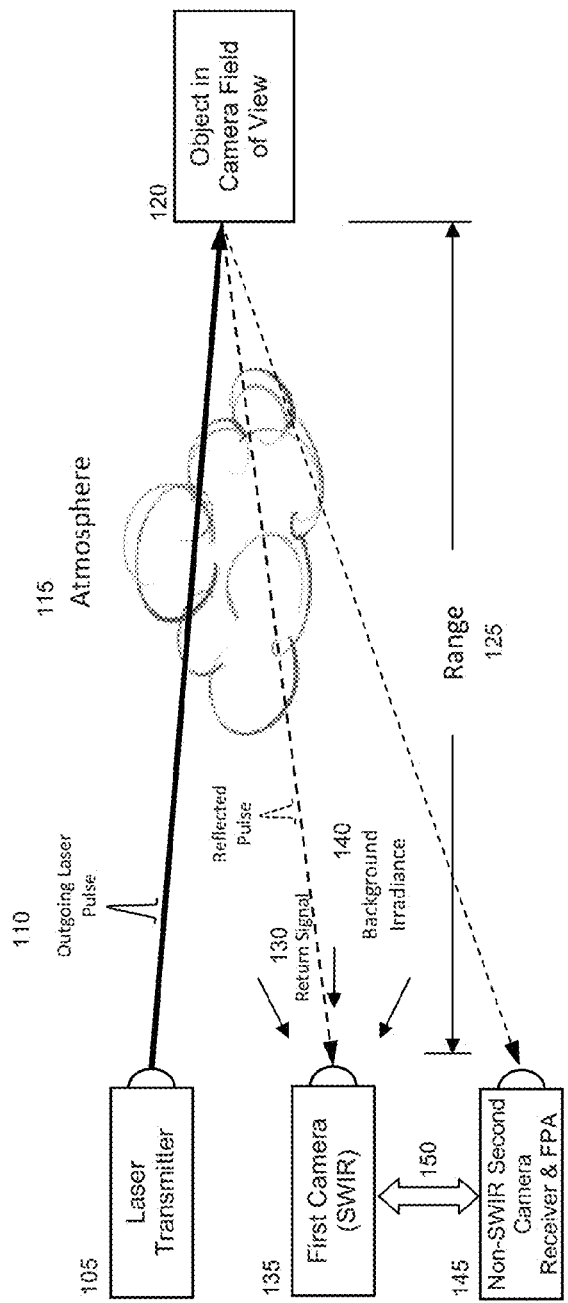
FIG. 1 is a System Environment diagram including a secondary imager connected to the first, but operating in a different wavelength configured in accordance with one embodiment of the invention.

The invention provides a means to directly and covertly observe the location of a spot being illuminated by a pulsed laser as a means to verify that the correct location is being illuminated.

In a typical embodiment, a pulsed laser is used to illuminate an object located at some distance from the invention, by outputting a single low power pulse in response to an operator request. Operation using a single laser pulse is a preferred embodiment as it enhances the ability to operate covertly. However, embodiments based on the use of multiple laser pulses are also envisioned.

A first camera is contained within a typical embodiment of the invention and incorporates a focal plane array (detector array) operating in a spectral band sensitive to the laser wavelength. This camera is used both to generate an image of the scene including the object being illuminated, and to also detect the laser energy reflected by the object. The acquisition of a frame of imagery by the camera is synchronized to the time-of-arrival of the laser pulse to ensure that the laser energy is detected within the exposure window of the detector array. The exposure window is also commonly known as the pixel integration time, the duration over which electrical charge accumulates in the pixel well in response to detected laser energy during that time. Upon completion of the integration time (closing of the exposure window) this accumulated charge is read out as the detector pixel signal.

The spatial location of the laser pulse within the image is then determined using various image processing techniques. Once the location is known, a marker is added to the image indicating the location of the laser spot in the image.

In another embodiment, a second camera is incorporated within the invention. This second camera operates in a different spectral band than the first imager to provide additional scene information and situational awareness to the operator. However, this second camera spectral band will generally not include the laser wavelength and thus this second camera will be incapable of detecting the reflected laser pulse energy.

The field of view of the second camera is aligned to that of the first camera. Once the spatial location of the laser spot has been determined by the first camera, this location is transferred to the imagery acquired by the second camera. A marker is introduced into the imagery of the second camera to indicate the location of the laser spot. This provides a means to indicate the location of the laser spot in the imagery from an imaging system otherwise insensitive to the laser wavelength.

The use of a second camera is not intended to be limiting, and the approach can be extended to additional cameras each operating in different wavelength bands as dictated by the application.

The first imaging system acquires images at a particular frame rate. Within each frame time, a detector array exposure window opens for a period of time during which the reflected energy from the scene being observed is collected. To maximize sensitivity, that is, the ability to detect the reflected laser energy, it is necessary to synchronize the time during which the exposure window is open to the time-of-arrival of the reflected laser pulse. In the ideal case, the exposure window opens just before the arrival of the laser pulse, remaining open only for the duration of the pulse and then closing. This allows for full collection of reflected laser pulse energy while minimizing the amount of background energy (clutter) collected from the scene. In practice, the exposure window must be opened long enough to account for uncertainties in time-of-arrival of the laser pulse, which will differ based on distance to the object being illuminated by the laser.

This synchronization of the exposure time window to the arrival of the reflected laser pulse is accomplished by the invention, and results in embodiments incorporating two different modes of operation as follows. The following descriptions are not limiting. Various embodiments of the invention can incorporate either or both modes of operation.

The Internal Mode of operation is characterized by use of an internal pulsed laser source integral to and under control of the invention. In various embodiments his laser source may either be a dedicated component or a component of laser rangefinder (LRF) subsystem also contained within the embodiment. This mode of operation provides single laser pulse detection capability for covert operation. The laser is fired and a pulse emitted in response to an operator activated control or other triggering method within the invention. The exact time that the laser is to be fired relative to the trigger event is established based on the frame rate and exposure window timing of the first camera and the total round trip flight time of the laser pulse to the distant object and back. In a typical embodiment, the range to the object can be up to a maximum of about four kilometers, with a corresponding maximum laser pulse round trip flight time of approximately 27 microseconds. The laser fire timing is adjusted to allow the reflected return energy from the laser pulse to arrive during the time that the exposure window is open, resulting in detection of the laser pulse energy. In this mode of operation, the firing of the laser is synchronized to the exposure window timing.

The External Mode of operation is characterized by use of a laser source is external to, and not under control of the invention. An example of such a laser source would be an infrared (IR) Marker/Designator. This requires that the timing of the exposure window be synchronized to the firing of the laser since the laser itself is not under the control of the invention. In this case, for embodiments, it is necessary that the external laser source output multiple pulses in a predictable pattern. This allows the invention to synchronize the exposure window timing to the detected laser pulse train, and open this exposure window for laser energy collection based on the expected arrival time of a subsequent pulse or group of pulses.

A necessary aspect of the invention is to be able to operate in both dark night and bright daylight conditions. In daylight operation, there can be sufficient ambient illumination present to mask the low intensity reflected laser pulse energy detected by the first camera, making detection of the pulse difficult at best, particularly at long range. This requires the use of a narrow bandpass filter tuned to the laser wavelength which allows laser energy to be detected while also rejecting ambient sunlight.

The invention utilizes a combination of technologies in an orchestrated process to optimize laser spot detection and location within an engagement scene. The system/process/method is summarized as presented below:

Determine the laser pulse timing for the self-emitting platform—Internal Mode of operation. Internal Mode laser pulse timing is controlled by the invention.

Determine the laser pulse timing from another designating platform (External Mode). The laser detection subsystem synchronizes to any PRF code from an external infrared (IR) marker or other designator.

Set the on-board first camera to collect an image frame coincident with the arrival of the reflected laser pulse energy based on laser pulse timing information.

Minimize the camera integration time (exposure window duration) to minimize collection of background scene energy and increase the signal-to-noise ratio (SNR) of the laser detection.

Incorporate a narrow-bandpass laser wavelength optical filter for daylight operation as needed, dependent on the first camera timing limitations When operating in External mode, collect SWIR images without laser energy in the image frame in the time interval between IR marker/Designator pulse arrivals.

Spatially align the two SWIR (one with and one without laser energy) using image registration techniques. This eliminates scene frame movement (jitter) developed between frame captures.

Subtract an image frame that does not contain laser pulse energy from an image frame that does contain the laser pulse energy to create a difference image. Locate the laser pulse in the difference image through use of pixel amplitude thresholding and spatial filtering techniques. Pixel amplitude thresholding is used to reject all pixels with values below the threshold as not representative of the laser pulse. Spatial filtering, typically of a low-pass type is then applied to further reduce the residual noise in the difference image. This allows for identification of the pixels that represent the detected laser spot energy. The coordinate locations of these pixels identify the location and spatial extent of the laser pulse in the image.

With the pixel coordinates of the laser spot now known, this information is used to introduce an overlay marker or other symbology into the imagery of the first camera, and other cameras if used, which identifies the location of the laser spot in the image.

As mentioned, a laser spot is projected onto a distant object by a laser illumination source. The laser source is typically pulsed. The various embodiments of this invention incorporate a camera that provides the capability to detect the location of the laser spot in the scene. In various embodiments the laser illumination source can be either an integral component of the invention, a component external to the invention or both.

One embodiment of the invention consists of a first camera, operating in the short wave infrared (SWIR) wavelength band of approximately 0.9 µm to about 1.7 µm, which is used to capture both the image of the scene containing a laser designator spot and an image of the laser spot itself, and a second camera boresighted (aligned) to the first camera such that both cameras observe essentially the same scene.

The receiver optics of the first camera in this embodiment are characterized by having a field-of-view (FOV) of approximately 7.3 degrees horizontal by 5.5 degrees vertical, an F/# of approximately 2.08, an aperture diameter of approximately 60 millimeters and a detector pixel instantaneous field of view (IFOV) of approximately 200 microradians. The methodology described herein can be comprised of any IFOV, aperture size, F/# and FOV dependent on the range detection requirements, transmitted laser energy, and operational scenario.

The second camera operates in a different wavelength band from the first camera such that the laser spot wavelength may not be visible by the second camera. The location of the laser spot in the scene being viewed by the first camera can be determined using image processing techniques, and then transferred to a corresponding location in the image of the scene viewed by the second camera. An alternative embodiment utilizes the first camera only for observation of the scene and determination of the laser spot location. These embodiments can incorporate an internal laser illumination source such as from a laser rangefinder or utilize signals from separate, external laser illuminator/laser designator systems.

According to an embodiment of the invention, a first camera operating in the short wavelength infrared (SWIR) band is used to capture an image of the scene containing the actual laser spot. Since the laser output is typically pulsed, capture of the laser spot in the camera image requires synchronization of the camera focal plane array exposure window (integration time) to the anticipated arrival time of the reflected energy from the laser spot.

Two scene images are taken, one with the laser spot energy included, and one without. Image registration techniques are then used to spatially align the two images. This alignment is necessary to correct for the effects of any motion of the camera that may have occurred in the time interval between the acquisition of the two individual images.

Frame subtraction between the two now-aligned images is then performed to create a difference image, which is used to identify the location of the laser spot. Frame subtraction highlights differences between the two images by removing elements common to both (background clutter), but subtraction will introduce noise into the difference image.

A pixel amplitude thresholding approach is first applied to the difference image as a means to distinguish the image pixels representing the laser spot energy (signal pixels) as those pixels with values that exceed a threshold value. Pixel values that contain noise will generally fall below the threshold and are disregarded.

A low-pass spatial filter is then applied to this thresholded difference image to further reduce the effects of noise in the image. This is typically an N-by-N filter with the size N being based on the expected size of the laser spot; a typical size is for N to be 3 to 5 pixels.

Once the pixels representing the laser spot have been identified, the location and size of the laser spot in the image are determined. This information is then used to create an image overlay marker representative of the laser spot that is introduced into the camera imagery to identify the laser spot location.

In various embodiments where additional cameras operating in other wavelength bands and aligned to the first camera are incorporated, laser spot location markers can introduced into imagery from these cameras based on laser spot location and size information determined from imagery from the first camera. This allows the location of the laser spot to be identified in imagery from cameras operating in wavelength bands that may not be otherwise capable of detecting the reflected laser energy of the laser spot.

In embodiments where a second camera is used it becomes necessary to align the imagery from the second camera to that of the first camera at the pixel level, before the laser spot marker can be added to the second camera imagery. This is because in general, the fields of view, rotational orientation, and frame format may differ somewhat between the two cameras.

Alignment can be accomplished with image processing techniques such as scaling (magnification), rotation, and scene correlation. A region in the imagery from the first camera which includes the laser spot is scaled and rotated as necessary and then matched to a corresponding region in the imagery from the second camera. Additional processing such as pixel interpolation may be necessary to correct for any image format differences that might exist between the two cameras. Once the two images are aligned, the location of the laser spot within the image from the first camera is then transferred to the corresponding location in the imagery from the second camera.

In embodiments that utilize additional cameras, the same process applies whereby imagery from each additional camera is aligned to that of the first camera. The laser spot marker can then be incorporated at the proper location in the imagery from the additional camera(s).

Those skilled in the art will appreciate that this invention may be used in any application where it is desirable to see the spatial location of a pulsed energy illumination source (in this case a laser) in the video output of a camera operating a different wavelength band, or alternatively when operating in the same wavelength band as the illumination source, but such that the image timing and exposure adjustments of the camera for good image quality may not otherwise be conducive to observation of the pulsed illumination. This may have applicability in the remote sensing and/or hyperspectral imaging fields where image data from a specific location as designated by an independent marking laser is to be extracted from acquired imagery for more detailed processing. For some embodiments based upon detection of energy from pulsed laser designators, the imager would need to anticipate when the laser pulse is present, which may require some form of communication between the laser designator and imager.

FIG. 1 depicts a system operational scenario environment diagram 100. Laser transmitter 105 sends outgoing pulse 110 through atmosphere 115 to object 120 over range 125. Outgoing pulse 110 is reflected off of object 120 as return signal 130 back through atmosphere 115, to first camera (SWIR) receiver 135. While acquiring return signal 130, camera 135 also acquires background irradiation 140. Camera 135 also acquires an image of the scene being observed which includes object 120. Secondary imager camera 145 is connected 150 to the first imager camera 135, but operating in a different wavelength band so that while the same scene is being viewed by both imagers, the laser is only seen by primary (SWIR) imager 135.

Figure 2:
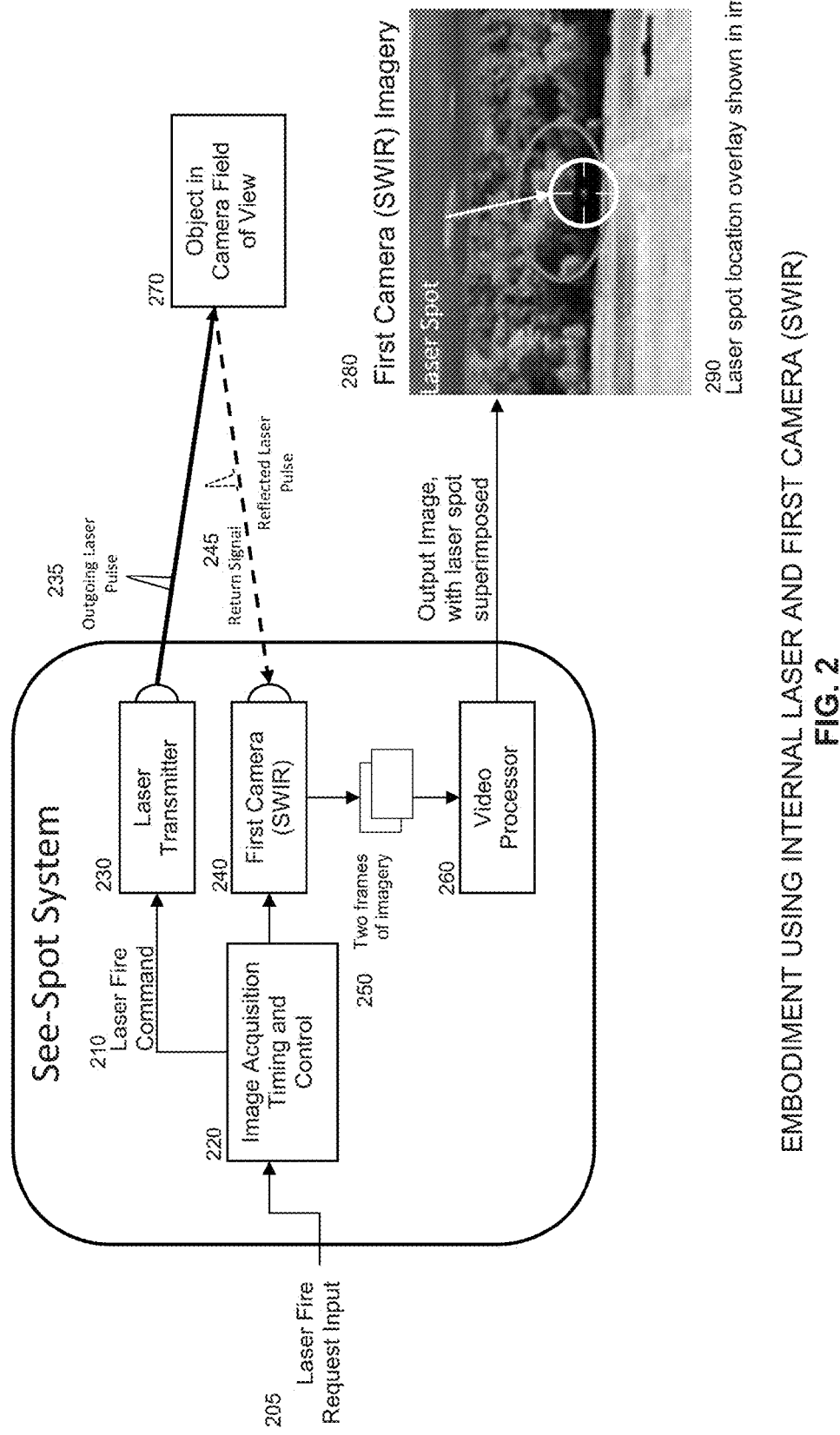
FIG. 2 depicts an embodiment operating in Internal Mode, incorporating an internal laser source and utilizing a short wave infrared camera (SWIR) as the first camera in accordance with one embodiment of the invention.

FIG. 2 depicts an embodiment 200 which incorporates internal pulsed laser transmitter 230 as the source to illuminate object 270 with laser pulse 235. Operation is as follows. The operator provides external input 205 to request that laser 230 output a pulse 235. This request is applied to Image Acquisition Timing and Control element 220 which sends Laser Fire command 210 to laser transmitter 230 to cause a laser pulse 235 to be output at the appropriate time. Image Acquisition Timing and Control element 220 provides image acquisition frame timing and exposure timing signals to First Camera 240 to control the image acquisition process. In alternative embodiments, Image Acquisition Timing and Control element 220 may instead receive some or all of these timing signals from first camera 240 as an indication of the image acquisition process occurring within that camera. The Exposure Timing and Control element determines when to initiate a laser pulse firing based on the timing of first camera 240 image acquisition process, such that laser pulse return signal 245 arrives at first camera 240 while the first camera exposure window is open, allowing energy the energy from reflected laser pulse 245 and from the scene to be acquired.

To detect the laser spot in the acquired image, a second image of the scene that does not contain the laser energy is also acquired. These two images 250 are applied to video processor element 260 which applies various image processing methods to the two images 250 including image scaling and registration, frame subtraction, pixel amplitude thresholding and spatial filtering to identify the size and location of the laser spot in the image. This information is then used to create overlay 290 marking the location of the laser spot which is then incorporated into camera output image 280 by video processor 260.

Figure 3:
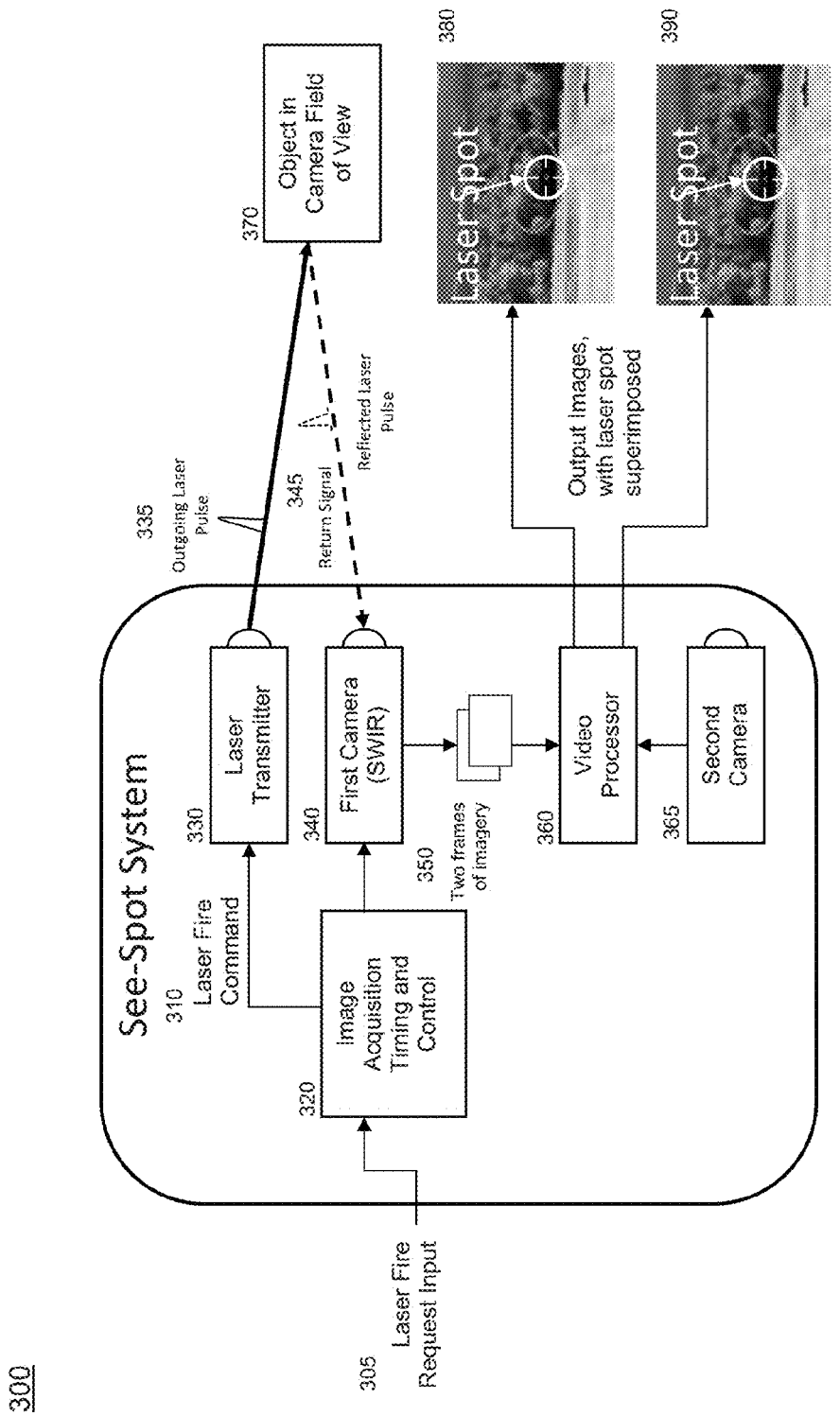
FIG. 3 depicts an embodiment operating in Internal Mode, incorporating an internal laser source and utilizing both a first camera (SWIR) and a second camera in accordance with one embodiment of the invention.

FIG. 3 depicts an embodiment 300 that adds second camera 365 to the embodiment 200 depicted in FIG. 2. In this embodiment, imagery from the second camera 365 is input to video processor 360. Laser spot size and location information determined by imagery from the first camera 350 is used to develop an overlay marker identifying the location of the laser spot which is incorporated into the imagery from both the first camera 340 and second camera 365 as shown. In various embodiments different forms of overlay symbology, including use of color coding of laser spot location information can be introduced into the output imagery. The use of a second camera in this embodiment is not intended to be limiting. It can be appreciated by those trained in the art that embodiments incorporating additional cameras can be realized.

Figure 4:
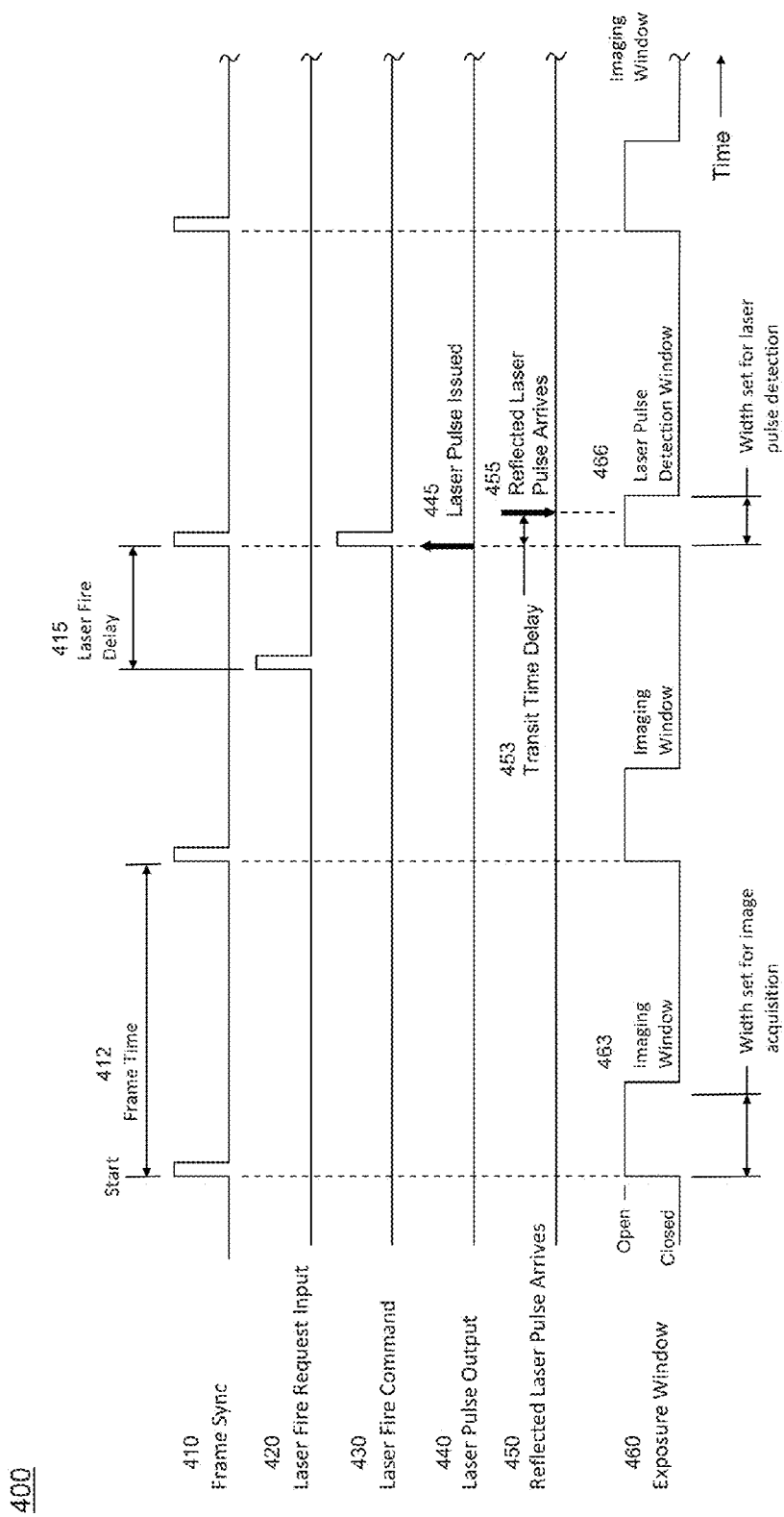
FIG. 4 depicts the timing necessary to launch and acquire a reflected laser pulse during the exposure time of a focal plane in accordance with an embodiment of the invention depicted by FIG. 3.

FIG. 4 depicts an embodiment 400 of the timing internal to the Image Acquisition Timing and Control elements (220, 320) depicted in embodiments 200 and 300 which controls the firing of a laser pulse (235, 335) by synchronizing the generation of the Laser Fire command (210, 310) such that the reflected laser pulse (245, 345) arrives at the first camera (240, 340) while the camera exposure window is open thereby acquiring energy from the scene.

The Frame Sync signal 410 is a periodic command issued by the Image Acquisition Timing and Control element to the first camera to acquire the next frame of imagery. Typically, each rising edge of the waveform initiates the acquisition of a frame of imagery. The frame time 412 is the interval between successive Frame Sync pulses.

The first camera (240, 340) begins the process of acquiring an image when it receives a Frame Sync signal 410. The camera opens the focal plane exposure window 460 which allows the pixels comprising the camera focal plane to collect energy from the scene. The exposure window 460 is open for a variable time 463 typically determined by the brightness of the scene. The darker the scene, the longer the exposure window 460 is left open to collect sufficient scene energy to generate a useful image. Conversely, the exposure window 460 width is reduced when acquiring imagery from a bright scene.

In a typical embodiment, at some point during operation of the system the operator will actuate a control such as a trigger or push button in order to illuminate an object in the scene with a laser pulse. This input is shown as the Fire Laser Request Input (205, 305) signal. This signal requests that the laser output a pulse (235, 335) to illuminate an object (270, 370).

The first camera (240, 340) focal plane acquires scene energy only while the focal plane exposure window 460 is open. There is a transit time delay 453 between the issuance of the laser pulse 445 and the arrival of the reflected laser pulse 455 due to the distance that the laser pulse must travel to the object and back to the camera. The laser firing must be timed such that the return pulse arrives when the exposure window is open. Complicating the situation is the fact that the range to the object is typically unknown; consequently, the return laser pulse may arrive at any time within a time window based on the minimum and maximum ranges over which the system operates. In a typical embodiment, the actual laser firing is delayed 415 until the start of the next frame time. The exposure window also opens at the start of the frame time and the exposure window duration for laser pulse detection (466) remains open only long enough to accommodate the maximum transit time of the laser pulse.

Opening the exposure window when the laser is fired, and leaving it open for the maximum transit time of the laser pulse based on maximum distance to the object avoids the need to anticipate the arrival time of the return laser pulse. This guarantees that an emitted pulse will always be detected. This allows for single pulse operation, greatly enhancing the ability to operate covertly. This does require that the exposure window for laser detection 466 be open for a duration longer than the absolute minimum necessary, as defined by the width of the laser pulse (235, 335) itself. Consequently, additional energy from the scene will be acquired along with the reflected laser pulse energy, degrading the laser pulse signal-to-noise ratio thus making it more difficult to detect the laser pulse in the acquired image.

Figure 5:
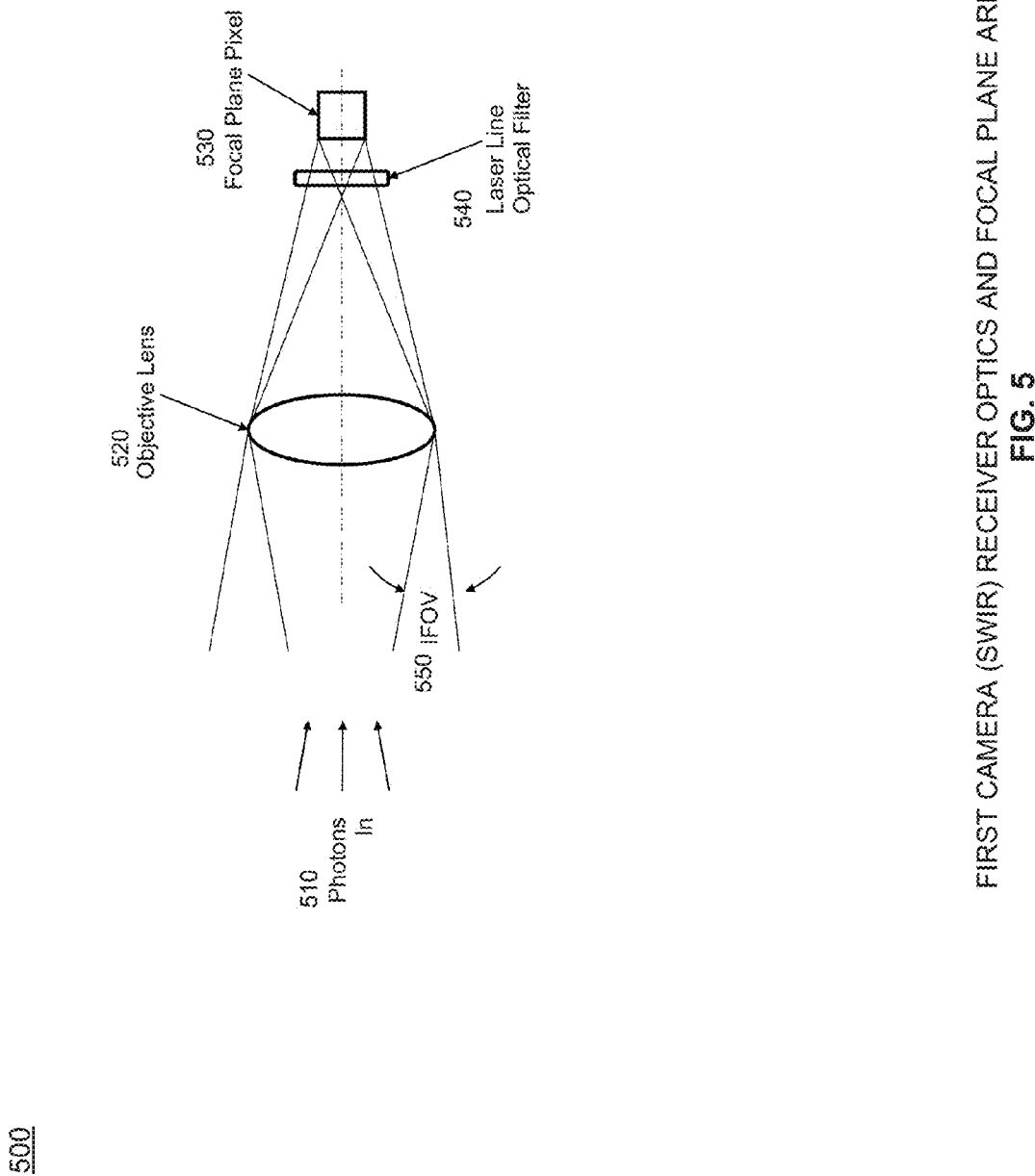
FIG. 5 depicts the short wave infrared (SWIR) receiver optics and focal plane array (FPA) system components configured in accordance with one embodiment of the invention.

FIG. 5 depicts first camera (SWIR) receiver optics and FPA system components 500. Photons 510 from the scene being observed by the first camera enter objective lens 520, followed by laser line filter 540 and impinging on a focal plane array (FPA) detector pixel 530. The detector pixel instantaneous field-of-view (IFOV) 550 which is a function of the detector pixel size and objective lens 520 focal length is shown, and represents the region of the overall scene viewed by the pixel.

Laser line filter 540 is characterized as having a very narrow wavelength passband that is matched to the wavelength of the outgoing laser pulse (235, 335). The purpose of this filter is to improve the signal-to-noise (SNR) ratio of a detected laser pulse by blocking much of the out-of-band energy acquired from the scene, thereby making the laser pulse more readily detectable. Use of this filter generally becomes necessary when operating in bright scene conditions where much of the energy collected by the focal plane pixel would otherwise be contributed from the scene rather than from the laser pulse. An example of such a filter is the Edmund Optics NT47-497 Laser Line Filter, with a 1064 nanometer center wavelength and a 4 nanometer bandwidth.

In various embodiments, laser line filter 540 can be switched in and out of the optical path. When the system (200, 300) is operating in an imaging mode using imaging window 463 for pixel exposure, the filter is switched out, allowing all ambient energy from the scene to be acquired by focal plane pixel 530. Laser line filter 540 is switched in when operating in laser pulse detection mode, when laser pulse detection window 466 is used during the time that the first camera (240, 340) is collecting an image frame containing energy from a laser pulse. Laser line filter 540 blocks much of the ambient scene energy making the energy from the reflected laser pulse (245, 345) energy more readily detectable above any residual scene energy acquired.

Figure 6:
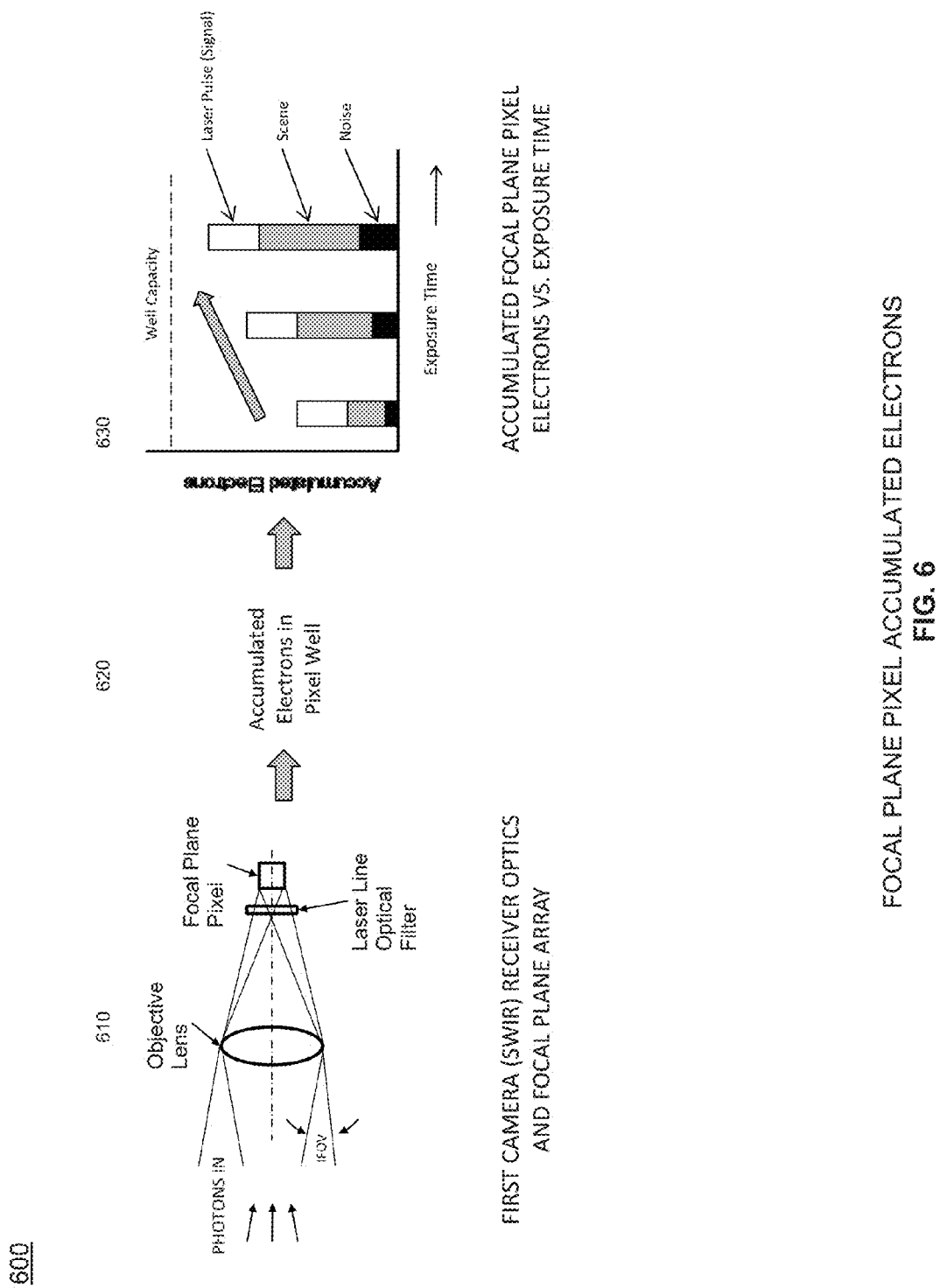
FIG. 6 depicts receiver optics and FPA and pixel accumulated electrons vs. exposure configured in accordance with one embodiment of the invention.

FIG. 6 depicts the first camera (SWIR) receiver optics and FPA of FIG. 5 and accumulated focal plane pixel electrons vs. exposure time diagram 630. Receiver optics and FPA 610 comprise the structure for accumulating photons from the scene and converting them to electrons through the action of the focal plane pixel. These electrons are accumulated as electrical charge in detector pixel well 620. The pixel well is an aspect of a detector pixel where electrons, generated in the pixel as a result of the incident photons being absorbed by the pixel detector element are accumulated during the time that the pixel exposure window 460 is open as shown in FIG. 4. Upon completion of the exposure time, the exposure window closes and these accumulated electrons (electrical charge) in the pixel well are read out as the detector signal. This signal represents the average brightness of the region of the overall scene within the IFOV of the detector.

Figure 7:
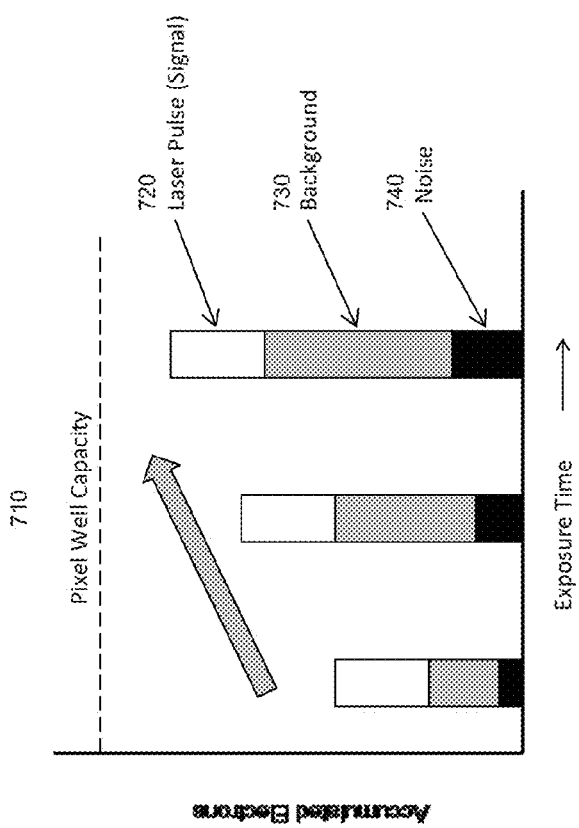
FIG. 7 depicts is a graph showing focal plane pixel accumulated electrons in the FPA pixel well vs. exposure time configured in accordance with one embodiment of the invention.

FIG. 7 depicts a diagram 700 of the components of the accumulated electrons in the pixel well and their increase as a function of exposure time. When acquiring an image containing laser spot energy, there are three contributors to the total number of electrons accumulated in the pixel well. Laser Pulse (Signal) 720 contribution is from electrons created in the detection process of laser photons collected by the first camera receiver optics. Scene 730 contribution is from electrons created in the detection process of photons collected from the scene exclusive of any laser energy that may be present. Noise 740 contribution is comprised of dark current electrical noise contributed by the detector pixel and additional electrical noise introduced by the read-out integrated circuit (ROIC) electronics. The ROIC is used to read the accumulated charge out of the pixel well at the end of the exposure time. The pixel well capacity 710 represents the maximum number of electrons that can be accumulated in the pixel well 620. It is generally desirable limit the number of electrons accumulated during the exposure time to approach but not exceed this well capacity.

When acquiring an image that contains a laser pulse, the total amount of charge representing Laser Pulse signal 720 is fixed based on the duration of the laser pulse. However, the contributions from scene 730 and noise 740 continue to increase with exposure time. Thus, the signal-to-noise ratio (SNR) as represented by the ratio of laser pulse signal to scene-plus-noise degrades as a function of exposure time.

This SNR degradation creates a tradeoff in the design of the system. For optimum detection performance, the SNR should be as high as possible, requiring that the exposure window be set to the minimum duration necessary to acquire the laser pulse. However, this minimum duration exposure window requires prior knowledge of the arrival time of the reflected laser pulse and precision timing in order to accurately synchronize the exposure window to the laser pulse arrival.

In the embodiments described here, an alternative approach is taken whereby the exposure window is opened for a time based on the total transit time of the laser pulse at the maximum range to the object. This eliminates the need for prior knowledge of the arrival time of the laser pulse. Although this approach simplifies timing requirements, it allows for the collection of more scene and noise electrons in the pixel well than is optimum and in some cases could exceed the pixel well capacity 710. This is resolved through use of laser line filter 540 described in FIG. 5. The filter allows the acquired laser energy to pass through to the pixel, while blocking the out-of-band scene energy, thus removing much of its contribution to the overall number of electrons accumulating in the pixel well. Electrical noise is kept low through proper design practices familiar to those trained in the art.

Figure 8:
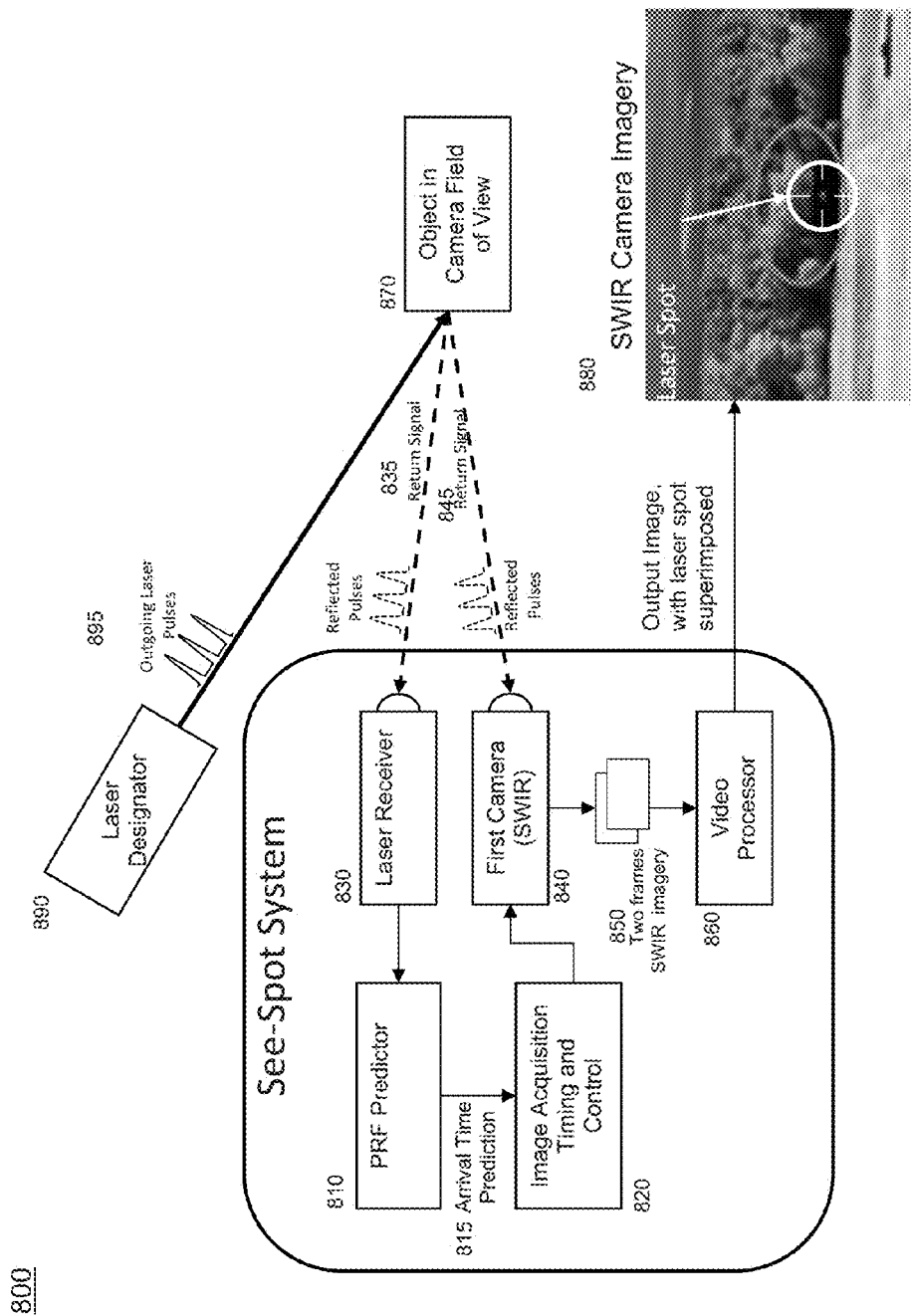
FIG. 8 depicts an embodiment operating in External Mode, incorporating a pulse repetition frequency (PRF) predictor to predict the arrival time of future laser pulses from an external Laser Designator based on a previously detected laser pulse sequence, and to provide synchronization and image exposure timing information to the First Camera (SWIR) in accordance with one embodiment of the invention.

FIG. 8 depicts an embodiment 800 which is based upon use of external laser designator 890 or other external pulsed laser source as the means to illuminate object 870. Laser designator 890 is external to the invention and is not under the control of the invention.

Operation is as follows. Laser designator 890 issues outgoing laser pulses 895 in a known or otherwise predictable pattern. These pulses are reflected by object 870 being illuminated by the laser. The reflected pulses represent the return signal and are acquired by both laser receiver 830 and first camera (SWIR) 840. The output signal from laser receiver 830 is input to Pulse Repetition Frequency (PRF) Predictor element 810. The PRF Predictor analyzes the pattern of incoming laser pulses 835 allowing it to predict the arrival time of the next laser pulse. This predicted arrival time information 815 is provided to Image Acquisition Timing and Control element 820 which initiates and controls the capture of two frames of imagery 850 by first camera 840.

The first image frame acquired of the scene contains the energy from the reflected laser pulse which is captured in the image. Acquisition of this first image frame is timed such that the exposure window opens during the predicted arrival time of the next laser pulse, allowing the laser pulse energy to be detected. Acquisition of the second image frame is timed such that the exposure window is open when a laser pulse is not predicted to arrive, thereby ensuring this second image frame contains energy from the scene only, and does not contain any reflected laser pulse energy. The acquisition of the frame is timed the frame is acquired (the exposure window is open) at a time when no laser pulse is expected to arrive.

The remaining operations of identification of the laser spot location in the imagery, the creation of an overlay marker that is added to the output image are the same as was described by FIG. 2 and FIG. 3.

The description of image acquisition timing is not intended to be limiting. It can be appreciated by those trained in the art that depending on the pulse repetition rate of the external laser, it may be possible to acquire multiple laser pulses during a single exposure window, particularly if the laser source provides for a high speed burst mode of laser pulse output. Additionally, it is possible to acquire and average together a succession of image frames that include laser spot imagery from successive laser pulses as a means to reduce the noise in the averaged frame, thereby improving SNR and making the laser spot location more readily detectable.

FIG. 8 depicts an embodiment that utilizes only a first camera 840. However, other embodiments utilizing multiple additional cameras operating in different wavelength bands, as described by FIG. 3 are also envisioned.

Figure 9:
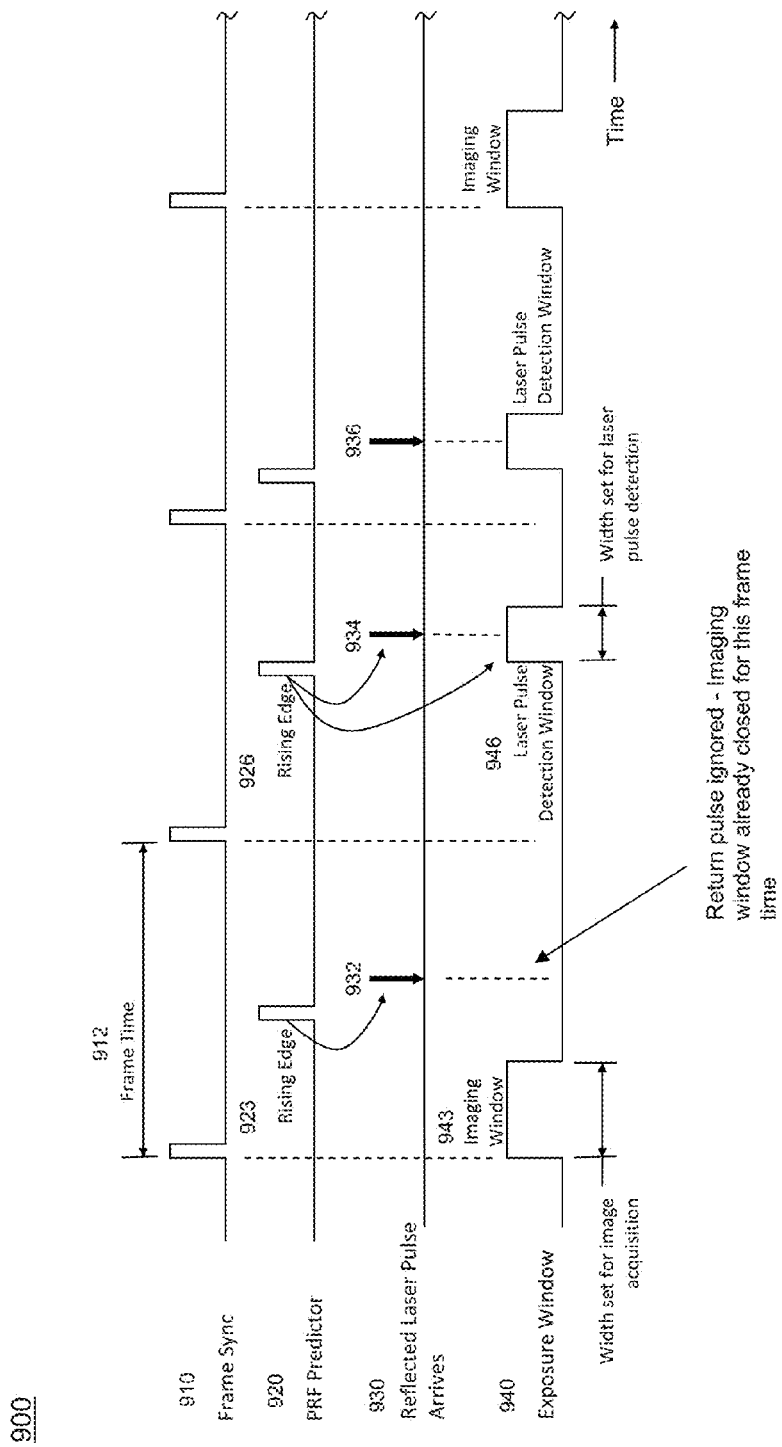
FIG. 9 depicts the timing necessary to acquire a reflected laser pulse when operating with an external laser source such as a laser designator in accordance with an embodiment of the invention depicted by FIG. 8.

FIG. 9 depicts an embodiment 900 of the timing internal to Image Acquisition Timing and Control element 820 depicted in embodiment 800 of FIG. 8. This element controls the acquisition of image frames by synchronizing the detector exposure window to the predicted arrival of laser pulses based on information provided by the PRF Predictor element 810.

The Frame Sync signal 910 is a periodic command issued by the Image Acquisition Timing and Control element to the first camera to acquire the next frame of imagery. Typically, each rising edge of the waveform initiates the acquisition of a frame of imagery. Frame time 912 is the interval between successive Frame Sync pulses.

PRF Predictor signal 920 is output by the PRF Predictor and provides an indication of when the next laser pulse will arrive at laser receiver 830. This is accomplished based in part on prior knowledge of the expected pattern(s) of laser pulses, and an analysis of the pattern of laser pulses that have arrived at the laser receiver 830.

Exposure window signal 940 controls both when, and for how long an FPA detector pixel will collect photons from the scene. In this embodiment, the exposure window is such that it can be controlled to open and close at any arbitrary time within a frame time.

In a typical imaging operation, the exposure window for imaging 943 opens at the start of a frame time and remains open for a duration established for good imaging performance. Any indication 923 from PRF Predictor signal 920 that a laser pulse is predicted to arrive within a particular frame time, but after the exposure window has already closed are ignored and laser pulse 932 is not detected by the focal plane pixel.

When the PRF Predictor signal 920 predicts the arrival of a laser pulse, the generation of Image Acquisition exposure windows 943 is suppressed. This allows Exposure Window signal 940 to open laser pulse detection exposure window 946 for a duration which is optimized for laser pulse detection. In embodiments, the exposure window could be opened multiple times during a frame-time based on the predicted arrival times of a known sequence of laser pulses.

This laser pulse detection window 946 opens just before the laser pulse arrives and remains open just long enough to acquire the entire pulse. This approach matches the duration of the exposure window to the length of the laser pulse, thereby maximizing the laser pulse SNR in the acquired image frame by minimizing the scene and electronic noise contributions to the electrical charge accumulated in the detector pixel well.

In various embodiments, the intensity of external laser designator source 890 may be sufficiently high as to make the laser spot clearly visible in at acquired image frame without the need for laser line filters or matched exposure window durations. In these embodiments, it is sufficient to maintain an exposure window duration 943 consistent with good image acquisition performance, but adjust the location of this window within a frame time based on the predicted arrival of the laser pulse.

Figure 10:
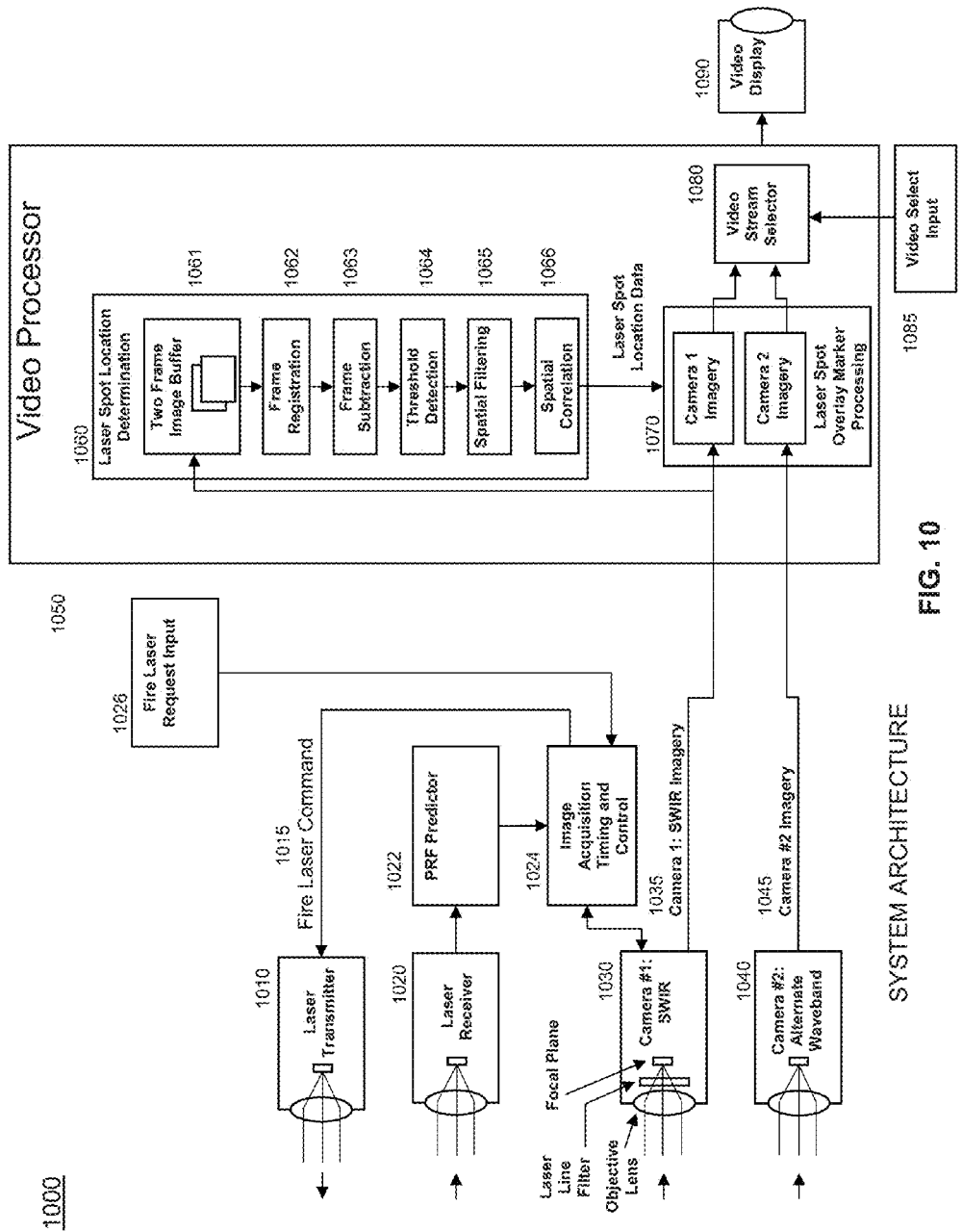
FIG. 10 depicts the system architecture including a laser transmitter to support Internal Mode of operation, a Laser Receiver, and PRF Predictor to support External mode of operation, and both first and second cameras, in accordance with an embodiment of the invention.

FIG. 10 depicts a block diagram of an embodiment 1000 of the invention which integrates the capability to operate with either an internal laser or an external laser designator, and incorporates multiple cameras for observation of the detected laser spot in imagery acquired in different wavelength bands. Each of the cameras utilized is spatially aligned such that imagery from each camera corresponds to the same scene.

Operation of 1000 when using the internal laser source is as follows. The operator inputs a request to fire the laser 1026 which is received by Image Acquisition Timing and Control element 1024. This element issues Fire Laser Command 1015 to Laser Transmitter 1010 at the appropriate time, causing at least a single laser pulse to be emitted. Image Acquisition Timing and Control element 1024 also commands Camera #1 (SWIR) 1030 to open an exposure window to acquire an image frame containing the energy from the reflected laser pulse and a second image frame that does not contain this laser energy. The imagery from Camera #1 1035 is applied to Laser Spot Location Determination element 1060. The acquired images are stored in frame buffers 1061. Frame Registration 1062 is performed to align the corresponding pixels in the two images in preparation for Frame Subtraction process 1063. A Threshold Detection process 1064 is then applied to the difference image resultant from Frame Subtraction process 1063.

The threshold value is typically set above the noise floor of the difference image. This allows identification of those pixels with values exceeding the threshold as representative of the size and location of the laser spot.

Spatial filtering 1065 is applied to the image resultant from Threshold Detection process 1064 to remove any residual noise in the image. A spatial correlation process 1066 is then applied to identify the location of the laser spot in Camera #1 imagery 1035. This location information is then provided to the Laser Spot Overlay Marker Processing element 1070. In this process, an icon or other symbology indicative of the size and location of the laser spot is added to Camera #1 imagery 1035. Camera #2 1040 also provides imagery 1045 to Laser Spot Overlay Marker Processing element 1070 where a laser spot marker symbology is also added to it at a corresponding location in the image. The video streams from the two cameras are presented to Video Stream Selector 1080. A Video Select Input 1085 provided by the operator or other external source selects which video stream to be presented to Video Display 1090 for observation.

Operation of 1000 when an external laser source is in use is described as follows. Laser receiver 1020 detects the presence of laser pulses from an external laser designator or other source. These signals are input to PRF Predictor element 1022 which analyzes the pattern of the arrival times of the laser pulses in order to predict the arrival time of the next pulse. This predicted arrival time is input to Image Acquisition Timing and Control element 1024 which adjusts the exposure window timing and duration as necessary to acquire an image with the laser pulse. Operation of the system from that point follows that when using an internal laser transmitter 1010. Various embodiments of 1000 can be envisioned which include some or all of the aspects described.

Figure 11:
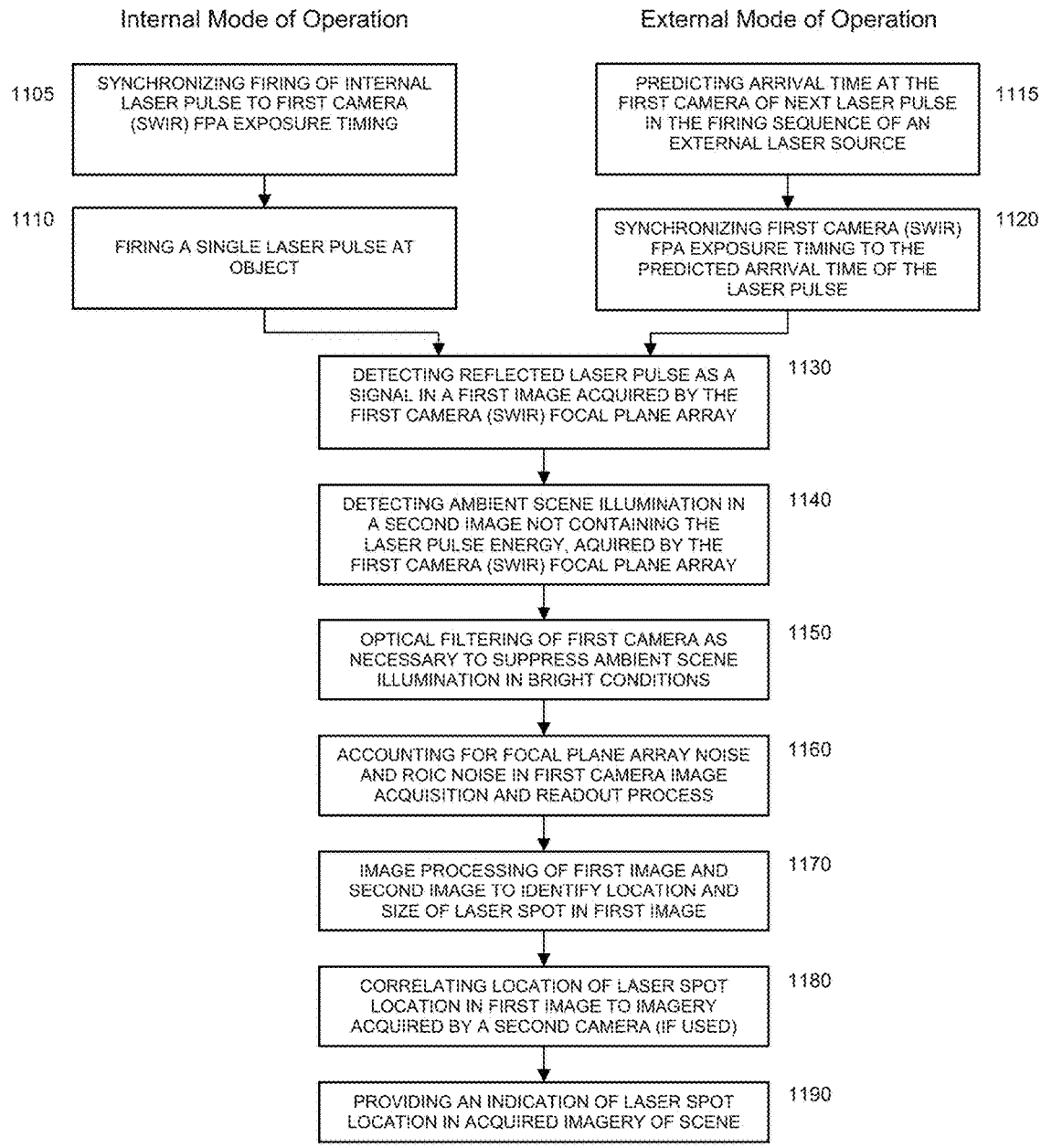
FIG. 11 is a method flow chart configured in accordance with one embodiment of the invention.

FIG. 11 is a flow chart 1100 of the method of an embodiment of the present invention carried out by means of the following steps depending on whether the system is operating in the Internal mode of operation or the External mode of operation.

When operating in Internal mode of operation, the timing of the firing of the laser pulse is first synchronized to the first camera (SWIR) focal plane array (FPA) exposure timing such that the subsequent arrival of the reflected laser pulse is timed to occur within the FPA exposure window 1105; the laser fires at least a single pulse at the object 1110.

When operating in the External mode of operation, a prediction of the arrival time at the first camera of the next laser pulse in the firing sequence of an external laser source 1115 is first made; The first camera (SWIR) focal plane array exposure timing is then synchronized to the predicted arrival time of the laser pulse 1120 such that the FPA exposure window occurs during the arrival of the laser pulse.

The remaining method steps are common to both Internal and External modes of operation. The reflected laser pulse is detected as the signal in a first image acquired by the first camera (SWIR) focal plane array 1130; detection of the ambient scene illumination in a second image acquired by the first camera (SWIR) focal plane array such that this second image does not contain laser pulse energy 1140; optical filtering of the first camera is used as it is necessary to suppress ambient scene illumination in bright conditions 1150; FPA and ROIC noise in the first camera image acquisition and readout process are also accounted for 1160; image processing of the first image and second image to identify the location and size of the laser spot in the first image 1170; correlating the location of the laser spot as determined in the first image to a corresponding location in images acquired by a second camera (if used) 1180; and an indication of the laser spot location is provided in acquired imagery of the scene 1190.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A laser marker and laser marker verification system comprising:
    synchronizing an integration time of an exposure window of a first camera focal plane to an arrival of at least a single laser pulse reflected from an object, whereby said at least a single laser pulse originates from a laser source comprising and under the control of the laser marker system or originates from an external source not under control of the laser marker system;
    determining arrival timing of said laser pulse and focal plane array (FPA) exposure window synchronization timing for said at least a single reflected laser pulse or said series of reflected laser pulses from an adjunct system;
    detecting said reflected at least one laser pulse as a signal by said first camera focal plane array (FPA) with synchronous timing and minimized exposure window duration corresponding to a laser pulse event in a first image;
    obtaining a second image of said object without said reflected at least one laser pulse;
    spatially aligning said first and second images to eliminate effects of camera motion between said first and said second images;
    spatially correlating the location of said detected reflected at least one laser pulse in an image to corresponding locations in other acquired images; and
    providing an indication of said laser spot location in imagery of said object in a scene.

2. The system of claim 1 wherein said at least a single pulse is a single short wave infrared (SWIR) pulse.

3. The system of claim 1 comprising eliminating background clutter by subtracting said second image from said first image to create a difference image.

4. The system of claim 1 wherein wavelength band of said first and said second camera is one of SWIR, long wavelength infrared (LWIR), mid-wavelength infrared (MWIR), and visible, such that said first camera is sensitive to a wavelength of said laser and wavelength band of said first camera is different from wavelength band of said second camera.

5. The system of claim 1 wherein said at least a single laser pulse originates from an integral laser illuminator and pulse fire timing is under control of said system and synchronized to a focal plane detector array exposure window.

6. The system of claim 1 comprising synchronizing timing of said focal plane detector array exposure window to pulsed laser illumination from an external laser source not under control of said system.

7. The system of claim 1 comprising applying a threshold value to pixel data from a difference image to reject pixel amplitudes below a defined minimum signal level as noise and to identify the pixels above said threshold value as signal to create a thresholded image.

8. The system of claim 7 comprising applying a spatial filter to said thresholded image to identify a candidate pixel grouping that best matches an expected pixel by pixel extent of said laser pulse energy.

9. The system of claim 1 wherein receiver optics comprise an instantaneous field of view (IFOV) of about 200 μrad, an aperture diameter of about 60 mm, an F/# of about 2.08, a horizontal field of view (HFOV) of about 7.3 degrees, and a spectral bandwidth of about 0.9 μm to about 1.7 μm.

10. A method for operating a laser marker and verification system comprising the steps of:
providing a first imaging system capable of detecting reflected laser pulse energy from an illuminated source and synchronizing an exposure window of a detector array of said first imaging system to arrival of a laser pulse, wherein said laser firing comprises
predictive timing generated by a laser pulse detector correlated to known pulse repetition frequency (PRF) codes utilized by infrared markers and designators;
providing an optical filter to reduce amount of ambient light on said detector array, and capable of being inserted in and removed from an optical path of said system;
processing images from said imaging system comprising frame subtraction and spatial filtering to identify a spatial location of said detected laser energy in acquired imagery; and
inserting symbology indicative of a spatial location of a laser spot in output imagery of a first camera.

11. The method of claim 10 further comprising:
filtering with a narrow bandpass optical filter in an optical path allowing said laser pulse energy to pass through while suppressing as out-of-band detected background illumination particularly in bright conditions, whereby signal-to-noise ratio is increased allowing an increase in said exposure window duration.

12. The method of claim 10 wherein said exposure window duration is adjusted dynamically to account for bright day, overcast and night time operation.

13. The method of claim 10 comprising providing a second imaging system aligned to a field of view of said first imaging system;
transferring spatial location of said detected laser pulse energy to said second imaging system;
identifying a spatial location in imagery of said second imaging system; and
inserting symbology indicative of said spatial location of said laser spot in output imagery of said second imaging system.

14. The method of claim 10 wherein illumination conditions comprise bright sun, overcast daylight, full moon, quarter moon, clear starlight, and overcast starlight.

15. The method of claim 10 wherein a source of said detected reflected laser pulse energy is an external system issuing pulses in a known pattern, whereby prediction of arrival of next laser pulse is accomplished so that acquisition of said pulse by said first camera focal plane array is during exposure time of said first camera focal plane array.

16. The method of claim 10 comprising transferring said laser spot location to optional additional cameras for indication of laser spot location in the imagery of these cameras.

17. The method of claim 10 wherein a frame of imagery not containing reflected laser energy is collected as representative of the scene and subtracted from a frame of imagery that also includes energy from said reflected laser pulse.

18. The method of claim 10 comprising a thresholding process and spatial filtering process applied to a difference image.

19. A laser marker and laser marker verification system for transferring a location of and displaying a laser spot display marker acquired through use of a first camera operating in a wavelength band sensitive to a laser wavelength to an image acquired from a second camera operating in a wavelength band insensitive to said laser wavelength comprising:
collecting imagery from a focal plane array (FPA) of said first camera;
saving said first camera image of AN object;
firing a single laser pulse at said object;
detecting reflected single laser pulse by said first camera FPA;
detecting background illumination by said first camera FPA;
suppressing said first camera background illumination;
applying a scene thresholding noise rejection filter;
applying a spatial filter to said first camera image to allow detection of said location of said laser spot in said first camera image;
determining coordinates of said laser spot in said first camera image;
collecting an image of said object using a second camera;
locating laser spot coordinates determined from first camera image in said second camera image; and
displaying said laser spot display marker at said laser spot coordinates in said second camera image.

* * * * *